United States Patent
Huberman et al.

[11] Patent Number: 6,115,718
[45] Date of Patent: Sep. 5, 2000

[54] METHOD AND APPARATUS FOR PREDICTING DOCUMENT ACCESS IN A COLLECTION OF LINKED DOCUMENTS FEATURING LINK PROPRABILITIES AND SPREADING ACTIVATION

[75] Inventors: Bernardo A. Huberman; James E. Pitkow, both of Palo Alto; Peter L. Pirolli, San Francisco, all of Calif.

[73] Assignee: Xerox Corporation, Stamford, Conn.

[21] Appl. No.: 09/053,616

[22] Filed: Apr. 1, 1998

[51] Int. Cl.$^7$ .................................................. G06F 17/30
[52] U.S. Cl. ........................... 707/102; 707/501; 707/513
[58] Field of Search .................................. 707/102, 501, 707/513

[56] References Cited

U.S. PATENT DOCUMENTS

| | | | |
|---|---|---|---|
| 5,305,389 | 4/1994 | Palmer | 382/305 |
| 5,418,948 | 5/1995 | Turtle | 707/4 |
| 5,668,988 | 9/1997 | Chen et al. | 707/101 |
| 5,754,939 | 5/1998 | Herz et al. | 455/4.2 |
| 5,835,905 | 11/1998 | Pirolli et al. | 707/3 |
| 5,842,199 | 11/1998 | Miller et al. | 707/2 |
| 5,878,223 | 3/1999 | Becker et al. | 709/223 |

OTHER PUBLICATIONS

Mendelzon et al., "Querying the World Wide Web", *Proceedings of the 4th International Conference on Parallel and Distributed Information Systems*; Dec. 18–20 1996, Miami Beach, Florida, pp. 80–91.

Savoy, J. "Searching Information in hypertext systems using multiple sources of evidence", *Int'l . J. Man–Machine Studies ( 1993 )* 38, pp. 1017–1030.

*Primary Examiner*—Thomas G. Black
*Assistant Examiner*—William Trinh

[57] ABSTRACT

A method and apparatus for predicting document access within a collection of linked documents. The present invention utilizes a predictive technique known as "spreading activation" where document collections are graphically represented as a network. Empirical data is analyzed according to a law of surfing to generate a decay function which is used to dampen the activation as spreads through the network. Activation is applied to a set of focus documents and propagates through the network until a stable pattern of activation is achieved across all documents. From this stable pattern, the desired usage information is extracted. Such a system will provide several practical benefits to users of the World Wide Web. For example, the present invention can be used to identify relevant pages to a set of one or more focus pages or to predict the number of times a document will be accessed in a collection of linked documents. Further, alone or in combination, this information can be used in connection with web site design or re-design.

8 Claims, 7 Drawing Sheets

PAGES

|     | 401 | 402 | 403 | 404 | 405 | 406 | 407 |
|-----|-----|-----|-----|-----|-----|-----|-----|
| 401 | 0 | 20 | 0 | 0 | 0 | 0 | 0 |
| 402 | 0 | 0 | 0 | 0 | 10 | 15 | 0 |
| 403 | 0 | 0 | 0 | 0 | 0 | 0 | 0 |
| 404 | 0 | 0 | 0 | 0 | 0 | 0 | 0 |
| 405 | 0 | 0 | 0 | 0 | 0 | 0 | 0 |
| 406 | 0 | 0 | 0 | 0 | 0 | 0 | 7 |
| 407 | 0 | 0 | 0 | 0 | 0 | 0 | 0 |

PAGES

METHOD AND APPARATUS FOR PREDICTING DOCUMENT ACCESS IN A COLLECTION OF LINKED DOCUMENTS FEATURING LINK PROPRABILITIES AND SPREADING ACTIVATION

FIELD OF THE INVENTION

The present invention is related to the field of usage analysis of linked collections of documents, and in particular to analysis of document access patterns in a collection of linked documents.

BACKGROUND OF THE INVENTION

The ever-increasing universe of electronic information, for example as found on the World Wide Web (herein after referred to as the Web), competes for the effectively fixed and limited attention of people. Both consumers and producers of information want to understand what kinds of information are available, how desirable it is, and how its content and use change through time.

Making sense of very large collections of linked documents and foraging for information in such environments is difficult without specialized aids. Collections of linked documents are often connected together using hypertext links. The basic structure of linked hypertext is designed to promote the process of browsing from one document to another along hypertext links, which is unfortunately very slow and inefficient when hypertext collections become very large and heterogeneous. Two sorts of aids have evolved in such situations. The first are structures or tools that abstract and cluster information in some form of classification system. Examples of such would be library card catalogs and the Yahoo! Web site (URL http://www.yahoo.com). The second are systems that attempt to predict the information relevant to a user's needs and to order the presentation of information accordingly. Examples would include search engines such as Lycos (URL: http://www.lycos.com), which take a user's specifications of an information need, in the form of words and phrases, and return ranked lists of documents that are predicted to be relevant to the user's need.

Another system which provides aids in searching for information on the Web is the "Recommend" feature provided on the Alexa Internet Web site (URL: http://www.alexa.com). The "Recommend" feature provides a list of related Web pages that a user may want to retrieve and view based on the Web page that they are currently viewing.

It has been determined that one way to facilitate information seeking is through prediction of relevant web pages to a particular source page on a Web Site. One technique for such prediction is described by P. Pirolli, J. Pitkow and R. Rao in the publication entitled *Silk from a Sow's Ear: Extracting Usable Structures from the Web*, Conference on Human Factors in Computing Systems (CHI 96), Vancouver British Columbia, Canada, April 1996. Described therein is a "spreading activation" technique. Spreading activation techniques are based on representations of Web pages as nodes in graph networks representing usage, content, and hypertext relations among Web pages. Conceptually, activation is pumped into one or more of the graph networks at nodes representing some starting set of Web pages (i.e. focal points) and it flows through the arcs of the graph structure, with the amount of flow modulated by the arc strengths (which might also be thought of as arc flow capacities). The asymptotic pattern of activation over nodes will define the degree of predicted relevance of Web pages to the starting set of Web pages. By selecting the topmost active nodes or those above some set criterion value, Web pages may be aggregated and/or ranked based on their predicted relevance. It should be noted that the graph networks described are based on acquired information, i.e. the usage, content and hypertext, information for the Web site. Sometimes such acquired information, in particular the usage information, is difficult to obtain.

Another valuable piece of information would be estimates as to the number of "hits" a web page may be expected to have. This information would be very valuable to web site

SUMMARY OF THE INVENTION

A method and apparatus for predicting the frequency of document access in a collection of linked documents is disclosed. In particular, the present invention embodies a model which indicates a probability that a user will access a document during the course of browsing the collection of linked documents. The present invention is implemented on the World Wide Web and will provide several practical benefits to users of the World Wide Web. For example, the present invention can be used to identify relevant pages to a set of one or more focus pages or to predict the number of times a document will be accessed in a collection of linked documents. Further, alone or in combination, the present invention can be used to generate information for web site design or re-design.

The present invention utilizes a spreading activation technique to simulate transactional behavior within the collection of linked documents. The spreading activation technique as embodied in the present invention is as described by P. Pirolli, J. Pitkow and R. Rao in the publication entitled *Silk from a Sow's Ear: Extracting Usable Structures from the Web*, Conference on Human Factors in Computing Systems (CHI 96), Vancouver British Columbia, Canada, April 1996.

In spreading activation, the document collection is represented via a matrix as a network. A critical analytical component in spreading activation techniques is the decay of activation as it spreads through the network. This decay is the amount of activation lost as it spreads from one node to other linked nodes. In the present invention, a "law of surfing" is applied to empirical data to generate values for modulating the decay of activation. The "law of surfing" provides a model of user traversal (i.e. surfing) behavior in the document collection by indicating a probability that the user will traverse to a next document.

The method of the present invention is preferably implemented as a software program for execution on a computer based system and is generally comprised of the steps of: gathering empirical data for a document collection, initializing an initial activation pattern, initializing a page to page transition matrix, generating decay functions using the law of surfing and the gathered empirical data, spreading activation on the network based on the initial activation pattern, and gathering page usage information based on measured activation levels.

DETAILED DESCRIPTION OF THE INVENTION

A method and system for predicting document access in a collection of linked documents is disclosed. The information derived from such a system may be used to aid a user in browsing the collection, redesigning the organization of the collection or in creating visualizations of the collections. The present invention is premised on identifying documents related to one or more focus documents. In the context of the present application, most relevant is an indication that it has a high likelihood to be of interest to someone viewing the focus document and is based on empirical information of usage on the web site. Based on this information, various types of tools can be built such as aids for re-designing a web site to fit a desired usage pattern, browsing tools which identify "relevant" documents to one currently being viewed, and tools to predict the number of "hits" or accesses a particular web page may get in a particular timeframe.

The currently preferred embodiment of the present invention is implemented for analyzing collections of linked documents (i.e. Web Pages) residing on the portion of the Internet known as the World Wide Web (hereinafter the Web). The Web is the portion of the Internet that is used to store and access linked documents. A Web page may have multi-media content as well as relative and absolute links to other pages. A Web Site is a collection of related Web pages associated with an entity having a presence on the World Wide Web such as a company, educational institute or the like. "Surfing" a web site is a term used to describe the action of a user traversing a web site using the links between the various Web pages.

In this description, the term Web page is an instance of a linked document and the two terms may be used interchangeably. Moreover, it should be noted that the present invention is not limited to use on the Web and may be utilized in any system which provides access to linked entities, including documents, images, videos, audio, etc.

It has been observed that a collection of Web pages has a topology that is defined by links contained in the individual Web pages. Links are an indicator on a Web page which refers to another Web page and which can typically be retrieved in a point and click fashion. The link will specify the address, i.e. Uniform Resource Locator or URL, of the other Web page. In the Web the URL is commonly specified using the HyperText Transport Protocol (HUTP).

Figure 1:
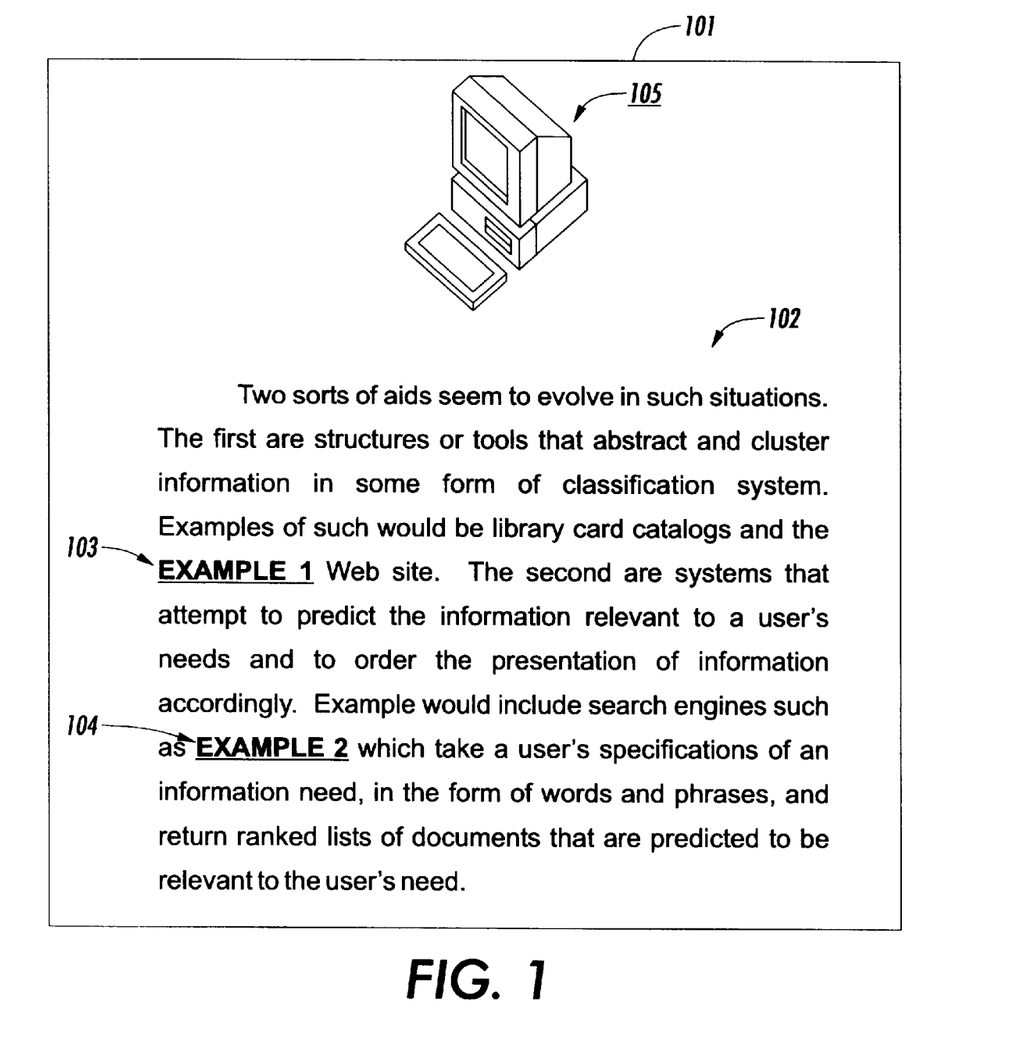
FIG. 1 is a block diagram illustrating the underlying structure of a Web Page.

FIG. 1 is a block diagram illustrating the underlying structure of a Web page. As would be known by one of ordinary skill in the art, such a Web page would be typically specified in a mark-up language such as the HyperText Mark-Up Language (HTML) and which would be viewable via a Web Browser. A Web Browser is a tool which enables a user to traverse through and view documents residing on the Web (i.e. surf the Web). Other rendering means associated with the Browser will permit listening to audio portions of a document or viewing video or image portions of a document. Examples of commercially available Web Browsers include Netscape Navigator™, available from Netscape Communications Corporation, and Internet Explorer™, available from the Microsoft Corporation.

Traversing or surfing the Web is accomplished typically by indicating selection of a link and then invoking a command to cause the browser to load and display the web page indicated by the link. In the aforementioned browsers, this is accomplished by using a cursor control device, such as a mouse or trackball, to point to the desired link and invoking a predetermined switch to indicate selection. This operation is commonly referred to as a "point and click" operation or "clicking" on a link.

In any event, the Web Page 101 has text content part 102 and links 103–105. The text content part 102 is merely the standard text of a document. The links 103–105 may be represented on a rendered page as either text (e.g. links 103–104) or image (e.g. link 105). As illustrated in FIG. 1, when the link is represented as text, it is visually distinct from ordinary text. In FIG. 1 the links 103 and 104 are underlined.

Figure 2:
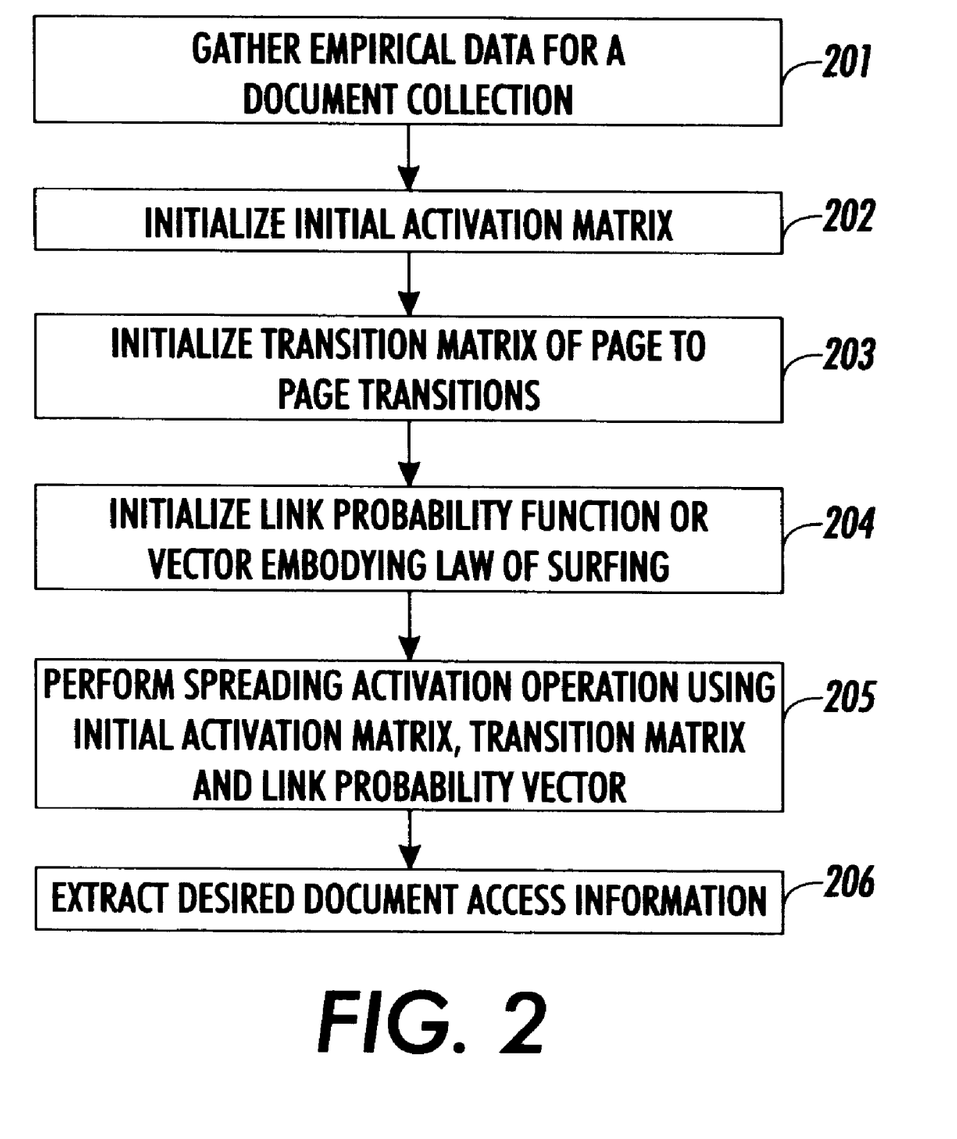
FIG. 2 is a flowchart illustrating the basic steps for predicting document access in the currently preferred embodiment of the present invention.

Overview of the Document Access Prediction Technique of the Currently Preferred Embodiment The flowchart of FIG. 2 describes the general steps of the present invention. First, empirical data relating to the document collection is gathered, step 201. The empirical data may typically reside on usage records for the particular document collection (e.g. derived from Web Site usage records). Next, an initial activation pattern $N(0)$ is initialized, step 202. The initial activation patterns indicate a focus set of web pages corresponding to the actual, hypothetical, or predicted initial information interests of one or more users. Preferably, it is represented as the expected number of users that will start at each page at the web site.

Next, a matrix of page to page transitions S is initialized, step 203. Preferably, this is a usage based matrix. The entries in the matrix indicate the proportion of users viewing a page that go to another linked page.

Next, a probability function or vector is initialized embodying the law of surfing, step 204. The law of surfing is based on observations of raw data concerning usage of a document collection. Generally speaking, the law of surfing provides an indication of the proportion of people who have produced L−1 clicks who then make another Lth click (i.e., the people who have not left after L−1 clicks).

Spreading activation is then performed using a suitable spreading activation technique, step 205. The spreading activation utilizes the above generated initial activation matrix, transition matrix and probability function (of vector). Finally, the desired information is extracted when a stable pattern of activation across all nodes (i.e. web pages) is settled into, step 206. This information will provide a predicted frequency of access of documents relative to the initial focus set of web pages.

Each of the steps are now described in greater detail.

Collecting Empirical Data

Raw empirical data is gathered for the document collection or web site from usage records or access logs of the web locality or by direct traversal of the Web pages in the document collection or Web site. The raw data used to verify the present invention was obtained from the System Administrators of the Xerox Corporation Web Site and from the administrator of the Web Site of large on-line service provider. "Agents" may be used to collect such raw data. However, it should be noted that the described agents are not the only possible method for obtaining the raw data for the basic feature vectors. It is anticipated that Internet service providers have the capabilities to provide such raw data and may do so in the future.

The collected empirical data as used in the present invention will span a particular time frame (e.g. a day, week or month). However, the data actually used for the analysis may be limited to some particular time period of interest, e.g. operation Monday through Friday. This may be useful if it is desirable to predict access patterns of a document collection during the week versus the weekends.

Initializing Initial Activation Pattern

As described above, the initial activation patterns is a focus set of web pages corresponding to the actual, hypothetical, or predicted initial information interests of one or more users. Preferably, it is represented as a matrix wherein the entries indicate the expected number of users that will start at each page in the document collection, i.e. web site.

Depending on the type of tool in which the present invention is used, the initial activation pattern may vary. For example, if interest is on how many times a particular class of pages are accessed, the initial activation matrix will focus on those pages (e.g. only have entries in the matrix representing those particular pages).

Initializing Matrix of Page to Page Transitions

The matrix of page to page transitions represents, based on the empirical data, the actual traversal of users in the document collection. In other words it is representation of the document collection as a usage based network. Such creation of a usage based network is described in co-pending application Ser. No. 08/ 831, 807, which is assigned to the same assignee as the present application.

The Law of Surfing

Through extensive empirical studies using different user communities several strong regularities of Web user surfing patterns have been discovered. These regularities can be described by a law of surfing, derived below, which determines the probability distribution of the number of pages a user visits within a Web site. In conjunction with a spreading activation algorithm, the law can be used to simulate the surfing patterns of users on a given Web site. This leads to accurate predictions of page hits.

The law of surfing is defined by a probability P(L) indicating the number of links L that a user follows in a Web site. P(L) is derived by considering that there is value in each page a user visits, and that clicking on the next page assumes that it will be valuable as well. Since the value of the next page is not certain, one can assume that it is stochastically related to the previous one. In other words, the value of the current page is the value of the previous one plus or minus a random term. Thus, the page values can be written as $$V_L = V_{L-1} + \epsilon_L \qquad (1)$$

where the values $\epsilon_L$ are independent and identically distributed Gaussian random variables. Notice that a particular sequence of page valuations is a realization of a random process and so is different for each user. Within this formulation, an individual will continue to surf until the expected cost of continuing is perceived to be larger than the discounted expected value of the information to be found in the future. This can be thought of as a real option in financial economics, for which it is well known that there is a threshold value for exercising the option to continue. Note that even if the value of the current page is negative, it may be worthwhile to proceed, since a collection of high value pages may still be found. If the value is sufficiently negative, however, then it is no longer worth the risk to continue. That is, when $V_L$ falls below some threshold value, it is optimal to stop.

The number of links a user follows before the page value first reaches the stopping threshold is a random variable L. For the random walk of Eq. 1 it has been determined that the probability distribution of first passage times to a threshold is given asymptotically by the two parameter inverse Gaussian distribution:

$$P(L) = \sqrt{\frac{\lambda}{2\pi L^3}} \exp\left(\frac{-\lambda(L-\mu)^2}{2\mu^2 L}\right) \qquad (2)$$

with mean $E[L]=\mu$ and variance $Var[L]=\mu^3/\lambda$.

The $\lambda$ and $\mu$ are estimated by estimating an Inverse Gaussian Distribution (IVGD) that fits the distribution of surfing paths for a Web collection. The IVGD fitting is done by estimating the $\mu$ and $\lambda$ parameters, using some standard known statistical technique like the Method of Moments, least-squares fitting, bayesian conjugate priors, etc. In the currently preferred embodiment, the method of moments is used. The parameters come from empirical data obtained by plotting the number of people surfing at a given depth (or clicks) and then using Eqs 2 or 4 to derive the distribution and the parameters.

Figure 3:
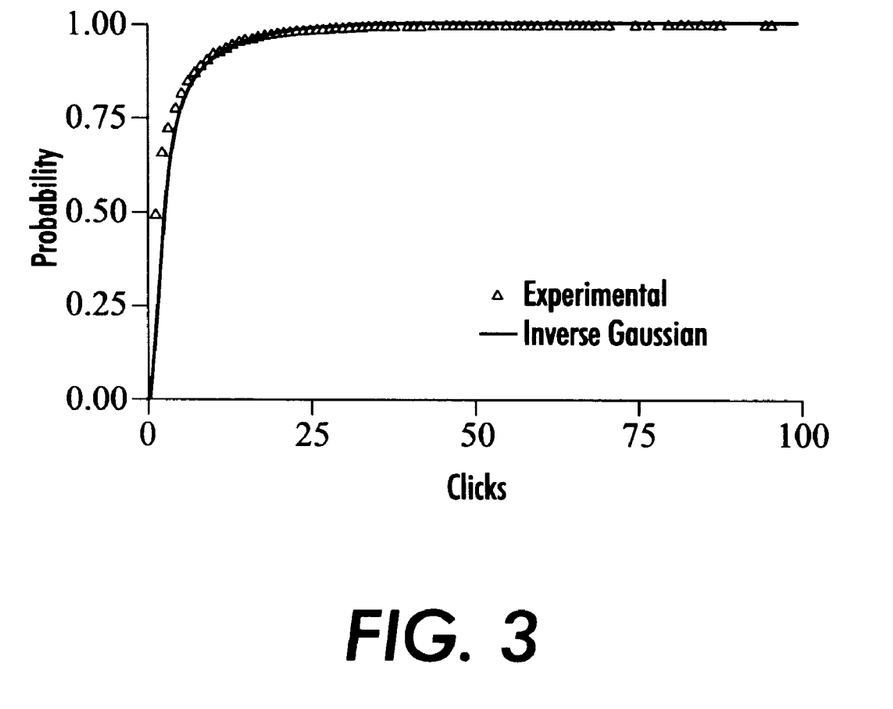
FIG. 3 is an illustration of an Inverse Gaussian Distribution indicative of user traversal patterns as found in the currently preferred embodiment of the present invention.

An example of an Inverse Gaussian Distribution characteristic of the law of surfing is illustrated in FIG. 3. This distribution has two characteristics worth stressing in the context of user surfing patterns. First, it has a very long tail, which extends much further than that of a normal distribution with comparable mean and variance. This implies a finite probability for events that would be unlikely if described by a normal distribution. Consequently, large deviations from the average number of user clicks computed at a site will be observed. Second, because of the asymmetry of the distribution function, the typical behavior of users will not be the same as their average behavior. Thus, since the mode is lower than the mean, care has to be exercised with available data on the average number of clicks, as it overestimates the typical depth being surfed.

Having determined that Eq. 2 is a good description of user surfing patterns, it is shown how in conjunction with spreading activation, it can predict the number of hits for each page in a Web site, a quantity of interest in electronic commerce. Spreading activation refers to a class of techniques that propagate numerical values (or activation levels) among the connected nodes of a graph. Their application ranges from models of human memory and semantics, to information retrieval. In the context of the Web, the nodes correspond to pages and the arcs to the hyperlinks among them, so that spreading activation simulates the flow of users through a Web site. Spreading activation is described briefly as follows and in greater detail below.

Consider a collection of n Web pages, each indexed by i=1, 2, . . . , n, and connected by hyperlink edges to form a graph. One can simulate the surfing activity of users by assigning a weight, $S_{j,i}$, between the $i^{th}$ and $j^{th}$ node. This weight can be interpreted as the fraction of continuing users at node i who proceed to node j if $$\sum_j S_{j,i} = 1,$$

where the sum is over all the nodes to node i by an edge. Let $f_L$ be the fraction of users who, having surfed along L−1 links, continue to surf to depth L. Defining the activation value $N_{i,L}$ as the number of users who are at node i after surfing through L clicks, one obtains $$N_{i,L+1} = f_L \sum_k S_{i,k} N_{k,L} \quad (3)$$

Note that eq. 3 is a definition of the spreading activation that is used in the currently preferred embodiment of the present invention. In any event, the fraction $f_L$ is found from Eq. 2 by noting that in a group of users it is equal to the ratio of the number of users who surf for L or more links to the number who surf for L−1 or more links. In terms of $F(L,\mu,\lambda)$, the CDF of the inverse Gaussian, it is given by $$f_L = \frac{1 - F(L, \mu, \lambda)}{1 - F(L-1, \mu, \lambda)} \quad (4)$$

With this definition, Eq. 4 can be iterated from initial conditions $N_{i,1}$. After most of the surfers have stopped, the predicted aggregate number of hits at each page is simply the sum over all iterations for each page.

Spreading Activation

Spreading activation can be characterized as a process that identifies knowledge predicted to be relevant to some focus of attention. As described by P. Pirolli, J. Pitkow and R. Rao in the publication entitled *Silk from a Sow's Ear: Extracting Usable Structures from the Web*, Conference on Human Factors in Computing Systems (CHI 96), Vancouver British Columbia, Canada, April 1996, spreading activation has been applied to the Web as a technique that can be used to make predictions as to pages relevant to a particular set of source pages. When used in connection with the law of surfing, other interesting sets of information may be derived, such as a prediction of the number of hits on particular pages of a Web site.

A decay function is a critical analytical component of the spreading is activation used in the present invention. As noted above, the law of surfing is used to generate decay values for dampening activation through a network. Depending on the nature of the decay function, activation values are assumed to be the predicted relevance to the input focus (or the probability that a page will be needed given the pages in the input focus).

The particular technique described has the property that the activation patterns that result from multiple input sources are just additive combinations of the activation patterns produced by each of the sources individually (multiple weighted sources are just weighted additions of the individual sources). Using this property, one may precompute the activation patterns that arise from each source combined with each graph. All complex patterns can be derived from these by simple vector addition. As described in co-pending application Ser. No. 08/831,807, and can be used to answer a number of interesting questions, such as assessing the typical web author at a web site or predicting the interest of home page visitors.

Networks for Spreading Activation

As outlined above, the network is used to represent strength of associations among Web pages as reflected by user surfing patterns through a web site. The network or graph is represented by matrices in the spreading activation equation. That is, each row corresponds to a network node representing a Web page, and similarly each column corresponds to a network node representing a Web page. If we index the 1, 2, ..., N Web pages, there would be i=1, 2, ... N columns and j=1, 2, ... N rows for each matrix representing a graph network.

Each entry in the $i^{th}$ column and $j^{th}$ row of a matrix represents the strength of connection between page i and page j (or similarly, the amount of potential activation flow or capacity). The meaning of these entries varies depending on the type of network through which activation is being spread. In the currently preferred embodiment, the entry values represent actual measured transitions between pages.

Figure 4:
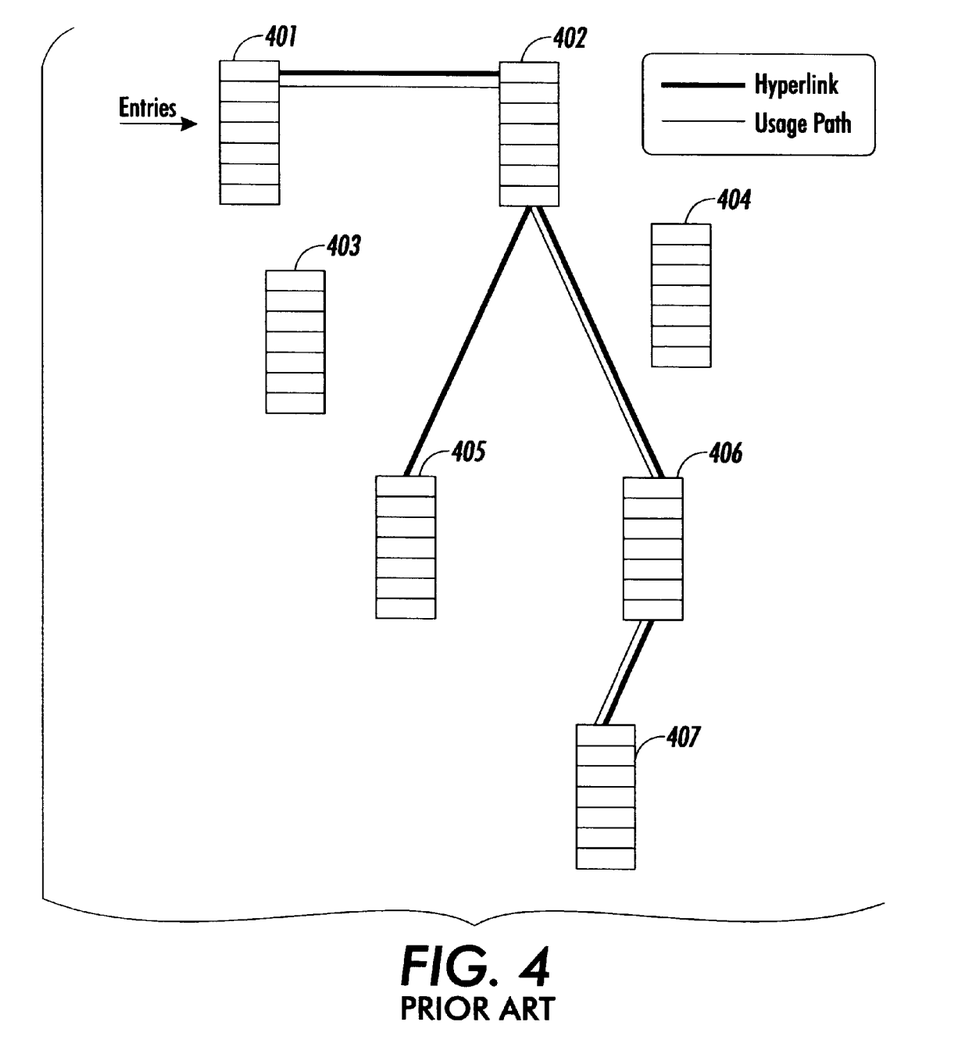
FIGS. 4–5 are diagrams showing a representation of a network as may be utilized by the spreading activation of the currently preferred embodiment of the present invention.
Figure 5:
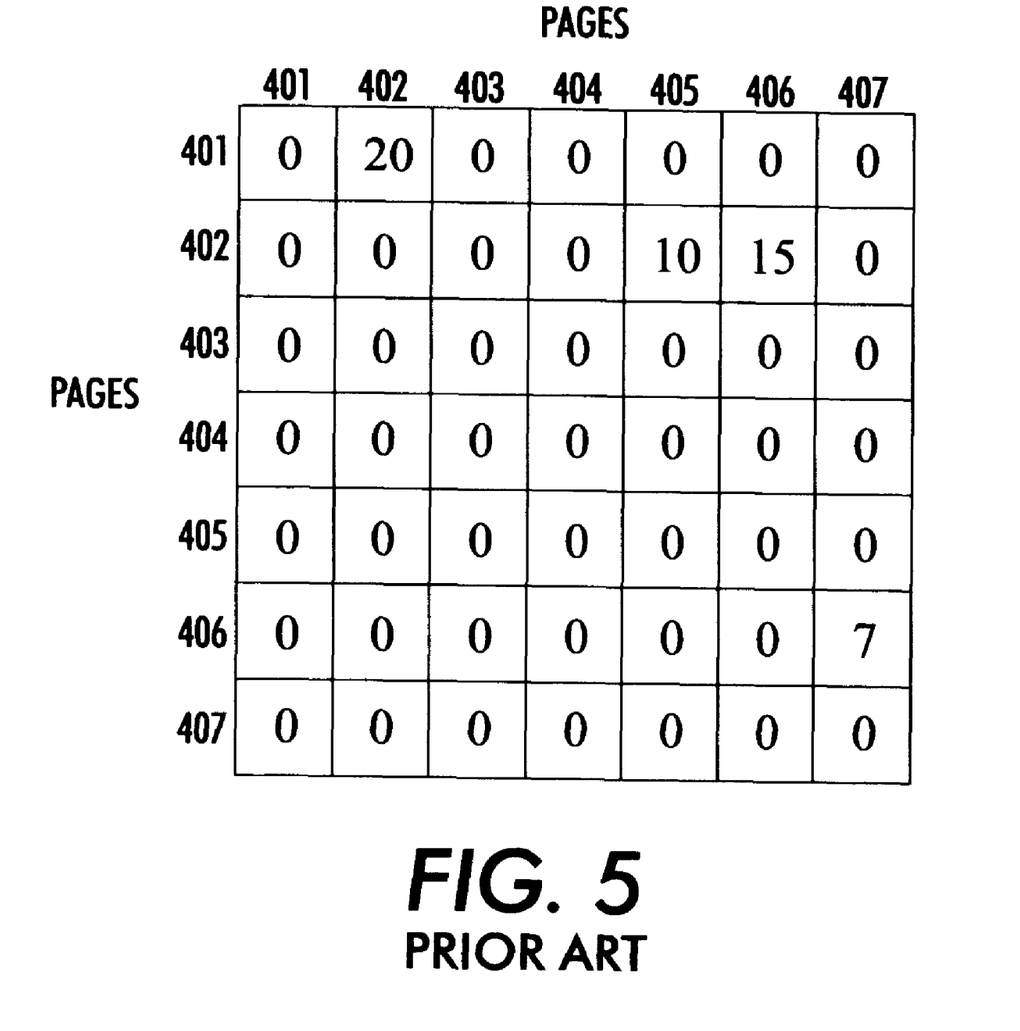

FIGS. 4–5 illustrate a network and corresponding matrix representation. Referring to FIG. 4, it should be noted that there will only be surfing between nodes where there are corresponding links. So illustrated on FIG. 4 are both links and the strength of the surfing path. Referring now to FIG. 5, for the matrix representation of surfing network an entry of an integer strength, s >=0, in column i row j, indicates the probability of a user surfing from page i to page j.

The Result of Spreading Activation

Figure 6:
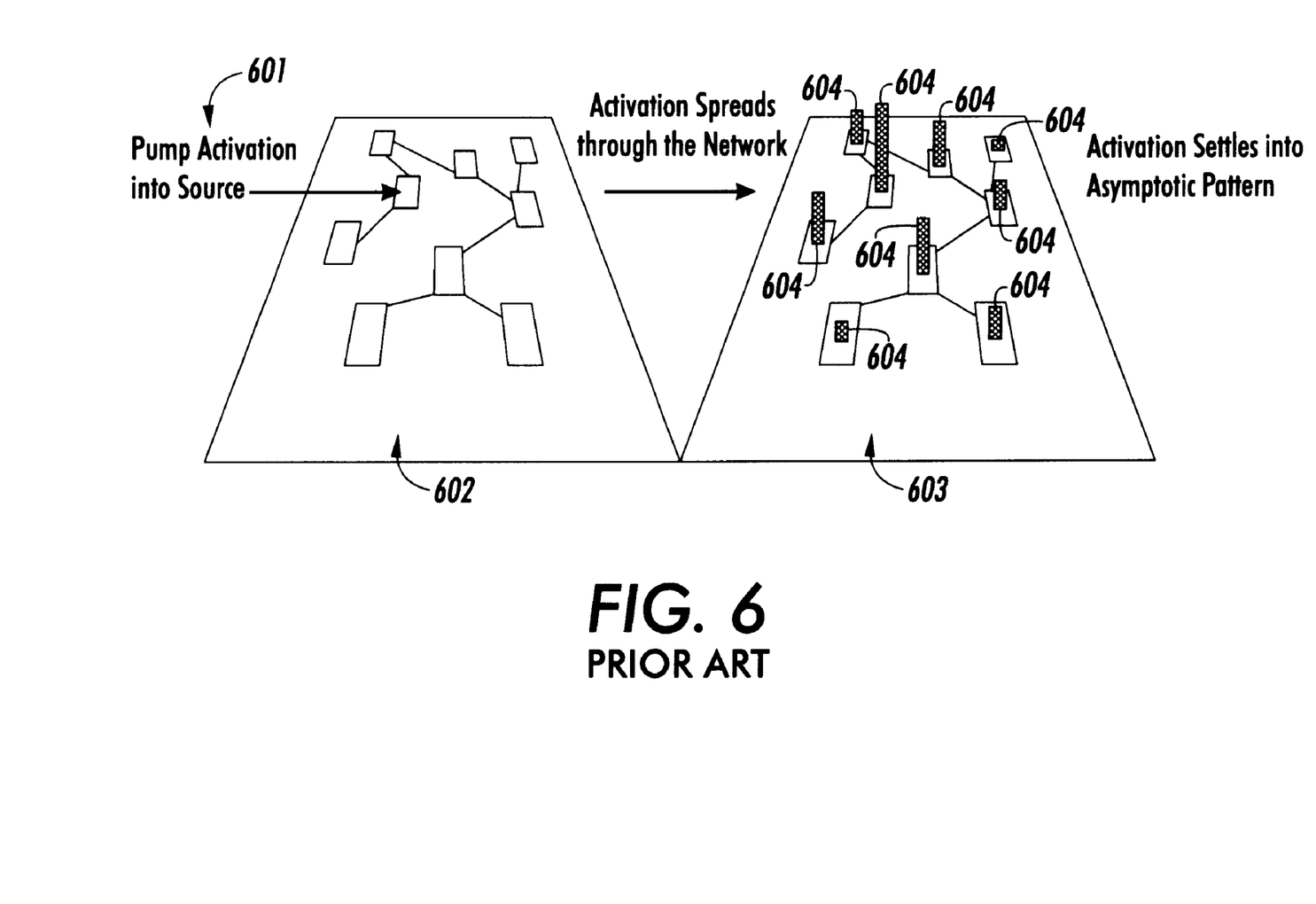
FIG. 6 is a diagram illustrating spreading activation and the result thereof to find relevant pages to a source page as may be performed in the currently preferred embodiment of the present invention.

Spreading activation across a network and finding related pages is described conceptually with reference to FIG. 6. Referring to FIG. 6, to activation 601 is pumped into one or more of the graph networks 602 at nodes representing some starting set of focus Web pages. The activation flows through the arcs of the graph structure, with the amount of flow modulated by the arc strengths (which might also be thought of as arc flow capacities) and dampened by the probability values provided by the law of surfing. The asymptotic pattern of activation over nodes, as illustrated by bars 604 contained in the nodes at activated network 603, will define a number of hits of other Web pages relative to the starting set of focus Web pages.

Implementation Examples

What follows are various examples of using the present invention to extract different types of information.

Predicting the Number of Hits on a Particular Web Page

Currently, the state-of-the-art Web site logfile analysis tools enable the post-hoc analysis of traffic at the web site. The logfile is a record of activity, e.g. links in, out or within pages of the web site. The Inverse Gaussian distribution derived from the law of surfing enables the construction of predictive models of traffic at Web sites. For this embodiment, the Web site's logfiles are analyzed and the following data computed:

The number of times people enter the Web site via a particular Web page (i.e., users quite often get into a Web site not from the main or home page, (e.g., www.xerox.com) but via other pages pointed to by the user's bookmarks, search engine results, etc.). The result of this step is a vector of frequencies for all the pages in a Web site.

Determine the paths people take in the Web site.

Generate a state transition matrix based upon each user's paths.

Compute the mean and standard deviation assuming an inverse Gaussian distribution for the number of clicks all users make at the Web site.

Perform the spreading activation algorithm using the entry points as the initial activation matrix, the state transition matrix as the connection/arc strengths, and the Inverse Gaussian distribution with the site's mean and standard deviation as the dampening parameter. Tabulate the predicted hit count/frequency for each page by summing the activation at each page during each iteration of the spreading activation algorithm.

Prediction of Related Pages

The prediction of related pages may be done dynamically or in advance and can be used as an aid in browsing. For example, when a user is undecided as to where to go next from a particular page, a list of related pages may be presented. The prediction of pages relevant to a particular page or set of pages is accomplished by:

Initializing the initial activation matrix to indicate the desired set of pages;

Initializing the transition matrix based on usage information for the web site;

Compute the mean and standard deviation assuming an inverse Gaussian distribution for the number of clicks all users make at the Web site Perform the spreading activation algorithm using the entry points as the initial activation matrix, the state transition matrix as the connection/arc strengths, and the Inverse Gaussian distribution with the site's mean and standard deviation as the dampening parameter. The pages having an activation value above a predetermined threshold are then provided as a list of related pages.

Web Site Design or Redesign

The present invention facilitates web design by providing a prediction of web traffic based on configuration. By altering the web design, i.e. the network, different usage and activation patterns may arise. The present invention could be used to predict the changes to the usage and activation patterns of the pages in the web site. Web design would be accomplished by the following:

Initializing initial activation matrix based on how web site would be redesigned. This would typically be a re-linking of the various pages at the web site so that a particular web page is presented at a particular place (e.g. a point where there is a higher probability that it will be linked to).

Initializing the transition matrix based on usage information for the web site;

Compute the mean and standard deviation assuming an inverse Gaussian distribution for the number of clicks all users make at the Web site Perform the spreading activation algorithm using the entry points as the initial activation matrix, the state transition matrix as the connection/arc strengths, and the Inverse Gaussian distribution with the site's mean and standard deviation as the dampening parameter. Determine if the web site modification has the desired effect (e.g. there is a prediction that the re-linked web page will receive more hits).

If predicted results are not satisfactory, make other changes to the web site topography and repeat the spreading activation.

Figure 7:
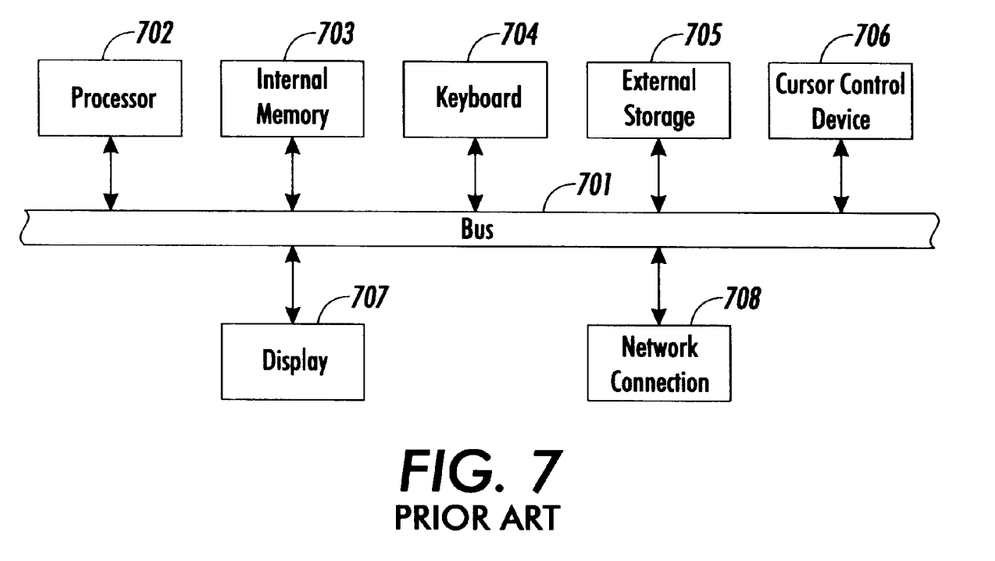
FIG. 7 is a block diagram of a computer based system as may be utilized to implement the currently preferred embodiment of the present invention.

Overview of a Computer Controlled Display System in the Currently Preferred Embodiment of the Present Invention The computer based system on which the currently preferred embodiment of the present invention may be implemented is described with reference to FIG. 6. The computer based system and associated operating instructions (e.g. software) embody circuitry used to implement the present invention. Referring to FIG. 7, the computer based system is comprised of a plurality of components coupled via a bus 701. The bus 701 may consist of a plurality of parallel buses (e.g. address, data and status buses) as well as a hierarchy of buses (e.g. a processor bus, a local bus and an I/O bus). In any event, the computer system is further comprised of a processor 702 for executing instructions provided via bus 701 from Internal memory 703 (note that the Internal memory 703 is typically a combination of Random Access and Read Only Memories). The processor 702 will be used to perform various operations in support extracting raw data from Web site, converting the raw data into the desired feature vectors and topology, usage path and text similarity matrices, categorization and spreading activation. Instructions for performing such operations are retrieved from Internal memory 703. Such operations that would be performed by the processor 702 would include the processing steps described in FIG. 2. The operations would typically be provided in the form of coded instructions in a suitable programming language using well-known programming techniques. The processor 702 and Internal memory 703 may be discrete components or a single integrated device such as an Application Specification Integrated Circuit (ASIC) chip.

Also coupled to the bus 701 are a keyboard 704 for entering alphanumeric input, external storage 705 for storing data, a cursor control device 706 for manipulating a cursor, a display 707 for displaying visual output and a network connection 708. The keyboard 704 would typically be a standard QWERTY keyboard but may also be telephone like keypad. The external storage 705 may be fixed or removable magnetic or optical disk drive. The cursor control device 706, e.g. a mouse or trackball, will typically have a button or switch associated with it to which the performance of certain functions can be programmed. The network connection 708 provides means for attaching to a network, e.g. a Local Area Network (LAN) card or modem card with appropriate software. The network ultimately attached to is the Internet, but it may be through proxy servers or intermediary networks or dial-up services such as America On-Line, Prodigy ™ or CompuServe ™.

Thus, a system for analyzing a collection of linked documents for the purposes of predicting documents related to a source document. While the present invention is described with respect to a preferred embodiment, it would be apparent to one skilled in the art to practice the present invention with other configurations of digital document management systems. Such alternate embodiments would not cause departure from the spirit and scope of the present invention. For example, the present invention may be implemented as software instructions residing on a suitable memory medium for use in operating a computer based system.

What is claimed is:

1. A method for predicting document access within a collection of linked documents comprising the steps of:

a) gathering usage data for said collection of linked documents;

b) generating initial activation information, said initial activation information indicating a set of focus documents in said collection of linked documents;

c) generating page to page transition information from said usage data, said page to page transition information indicating a strength of association between documents in said collection of linked documents;

d) generating link probability information from said usage data, said link probability information indicating a distribution of the number of documents a user will access in said collection of linked documents;

e) performing a spreading activation operation based on said initial activation information, page to page transition information and said probability information based on a network representation of said collection of linked documents; and f) extracting said document access information resulting from said spreading activation step when a stable pattern of activation across all nodes of said network representation of said collection of linked documents is reached.

2. The method as recited in claim 1 wherein said step of generating link probability information from said usage data is further comprised of the step of generating mean and standard deviation values for the number of document accesses made by all users in said document collection, said mean and standard deviation values based on an inverse Gaussian distribution.

3. The method as recited in claim 1 wherein said step of performing a spreading activation operation is further comprised of the step of using said link probability information as a dampening factor for activation across said network representation of said collection of linked documents.

4. A method for modeling document access in a collection of linked documents based on prior usage information of said collection, said method comprising the steps of:
   a) generating an initial activation matrix, said initial activation matrix indicating a set of focus documents in said collection of linked documents;
   b) generating a transition matrix using said prior usage information, said transition matrix indicating user traversal information between documents in said collection of link ed documents;
   c) generating a link probability vector from said prior usage information, said link probability vector indicating probabilities that a user will link to another document in said document collection;
   d) performing a spreading activation operation using said initial activation matrix, transition matrix and link probability vector to obtain a spreading activation result; and
   e) extracting document access information from said spreading activation result.

5. The method as recited in claim 4 wherein said step of generating a link probability vector from said prior usage information is further comprised of the step generating mean and standard deviation values for the number of document accesses made by all users in said document collection, said mean and standard deviation values based on an inverse Gaussian distribution.

6. The method as recited in claim 4 wherein said step of performing a spreading activation operation is further comprised of the step of using said link probability vector to dampen activation.

7. A system for predicting document access within a collection of linked documents comprising:
   means for gathering usage data for said collection of linked documents;
   means for generating initial activation information, said initial activation information indicating a set of focus documents in said collection of linked documents;
   means for generating page to page transition information from said usage data, said page to page transition information indicating a strength of association between documents in said collection of linked documents;
   means for generating link probability information from said usage data, said link probability information indicating a distribution of the number of documents a user will access in said collection of linked documents;
   spreading activation means for performing a spreading activation operation based on said initial activation information, page to page transition information and said probability information based on a network representation of said collection of linked documents; and
   information extraction means for extracting said document access information resulting from said spreading activation step when a stable pattern of activation across all nodes of said network representation of said collection of linked documents is reached.

8. The system as recited in claim 7 wherein said means for generating link probability information is further comprised of statistics generation means for generating mean and standard deviation values for the number of document accesses made by all users in said document collection, said mean and standard deviation values based on an inverse Gaussian distribution.

\* \* \* \* \*